United States Patent [19]

Fitzgerald et al.

[11] Patent Number: 5,255,251
[45] Date of Patent: * Oct. 19, 1993

[54] OPTICAL DISC CARTRIDGE HANDLING APPARATUS WITH REMOVABLE MAGAZINE

[75] Inventors: Timothy P. Fitzgerald, Minneapolis; David J. Rother, Hastings, both of Minn.

[73] Assignee: International Data Engineering, Inc., Minneapolis, Minn.

[ * ] Notice: The portion of the term of this patent subsequent to Oct. 8, 2008 has been disclaimed.

[21] Appl. No.: 776,201

[22] Filed: Oct. 15, 1991

Related U.S. Application Data

[63] Continuation-in-part of Ser. No. 602,631, Oct. 24, 1990, Pat. No. 5,123,000.

[51] Int. Cl.$^5$ ............... G11B 17/22; G11B 17/00
[52] U.S. Cl. ..................... 369/36; 369/192; 360/98.06
[58] Field of Search .......... 369/36, 34, 35, 42, 369/75.1; 360/98.04, 98.06, 98.01

[56] References Cited

U.S. PATENT DOCUMENTS

| | | | |
|---|---|---|---|
| 4,607,354 | 8/1986 | Ishibashi et al. | 369/39 |
| 4,614,474 | 9/1986 | Sudo | 369/36 |
| 4,675,856 | 6/1987 | Rudy et al. | 369/36 |
| 4,742,504 | 5/1988 | Takasuka et al. | 369/36 |
| 4,815,055 | 3/1989 | Fago, Jr. | 369/36 |
| 4,815,056 | 3/1989 | Toi et al. | 369/36 |
| 4,817,070 | 3/1989 | Hug et al. | 369/36 |
| 4,817,071 | 3/1989 | Carlson et al. | 369/36 |
| 4,827,463 | 5/1989 | Motoyoshi et al. | 369/36 |
| 5,001,582 | 3/1991 | Numasaki | 369/36 X |
| 5,036,503 | 7/1991 | Tomita | 369/36 |
| 5,056,073 | 10/1991 | Fitzgerald et al. | 369/36 |
| 5,123,000 | 6/1992 | Fitzgerald et al. | 369/36 |

Primary Examiner—Stuart S. Levy
Assistant Examiner—Joseph A. Rhoa
Attorney, Agent, or Firm—Palmatier, Sjoquist & Helget

[57] ABSTRACT

An optical disc cartridge handling apparatus, which has a removable cartridge magazine for loading and unloading groups of cartridges into the apparatus, for storing, handling, reading and writing of the optical discs stored within the cartridges. A flipper mechanism is provided to receive one of the cartridges from either of the magazine or an optical disc drive within the apparatus. Means are included for rotating the flipper mechanism about a common center line for inverting the cartridge within the flipper mechanism. A picker mechanism is included for moving the cartridge into and out of the flipper mechanism from either the magazine or the optical disc drive. A traverse mechanism is provided for supporting and moving the flipper mechanism along an axis of motion to locate the flipper mechanism adjacent either a particular slot of the magazine or the cartridge slot of the optical disc drive.

12 Claims, 5 Drawing Sheets

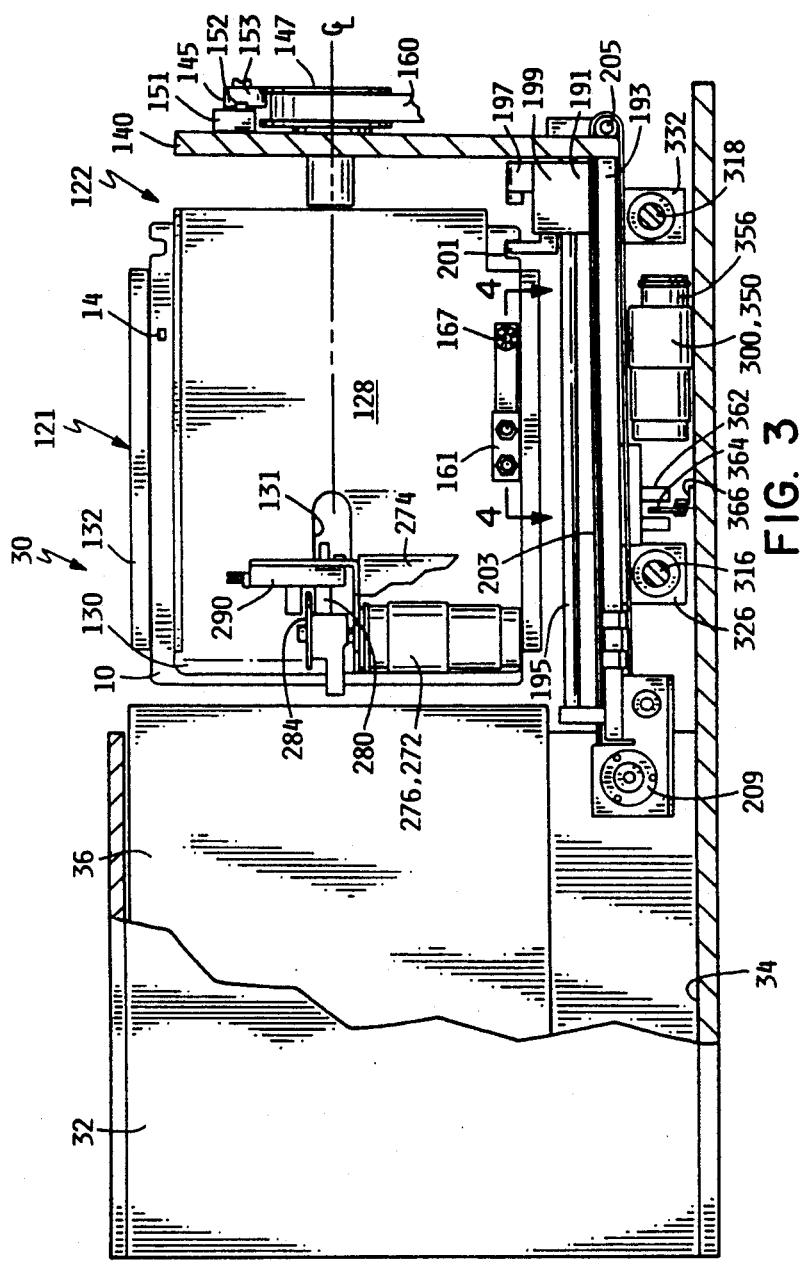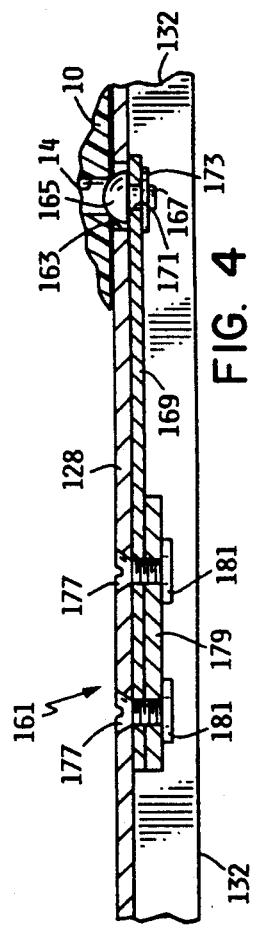

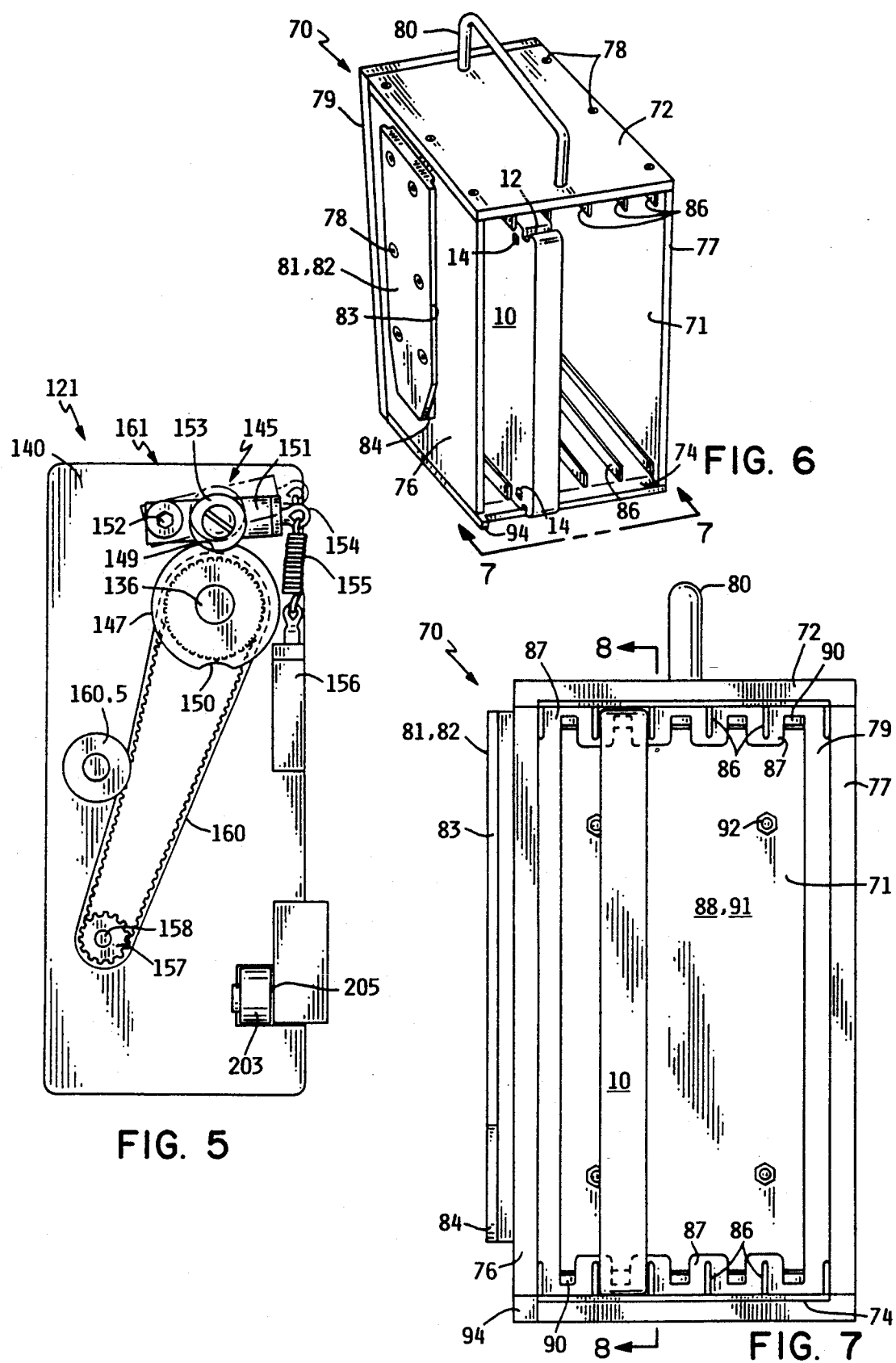

OPTICAL DISC CARTRIDGE HANDLING APPARATUS WITH REMOVABLE MAGAZINE

BACKGROUND OF THE INVENTION

This application is a continuation-in-part of co-pending patent application Ser. No. 602,631, filed on Oct. 24, 1990, now U.S. Pat. No. 5,123,000.

This invention relates to storage and handling of disc cartridges and more particularly to an optical disc cartridge handling apparatus with a removable disc cartridge magazine which stores and handles optical disc cartridges for the manipulation of data by a host computer.

The storage of data in magnetic media, such as floppy discs or tapes, is well known. However, optical discs have been found to be highly advantageous over the magnetic media. This is so because the optical discs have high degrees of integrity and data storage capabilities together with a high level of sensitivity as well as environmental toughness.

The optical disc cartridges which hold the laser discs are a high-density data storage media. Currently, the media hold 0.6 gigabytes per cartridge which are soon approaching 1.2 gigabytes on up to 3 gigabytes in the very near future. The cartridges perform the function of protecting the discs from dust or dirt. It has also been found that to keep the discs free from dust or dirt they advantageously should be continuously oriented in their vertical position rather than laying flat or horizontal which will subject the discs to collection of dust or dirt. Optical discs within cartridges are readily available in the marketplace such as from Sony Corporation of Tokyo, Japan.

Optical disc drives or the data transfer means are currently available in the market such as the RICOH 5030E REWRITABLE, TOSHIBA WM-D070 WORM, PIONEER DD-U5001 WORM, SONY SMO D-501 REWRITABLE, andMAXOPTIX TAHITI REWRITABLE. Typically, the optical disc cartridge must be removed and inverted or flipped with reinsertion for the drive to read the other opposite side of the disc within the cartridge. This is because most drives have only one laser thereby requiring the disc to be flipped over or inverted for reading or writing the other side of the disc. However, optical disc drives are beginning to be marketed and soon will be prevalent that will have more than one laser which will allow quick access to the storage data on either side of the optical disc media. In the present invention, the reading and writing of data storage on the optical disc within the cartridge is performed by the drive under the control of a host computer.

There is a need for an optical disc cartridge handling apparatus with a removable cartridge magazine that will operate as a library to vertically store a number of optical disc cartridges and which will place the cartridges within a particular optical disc drive as well as remove and replace the cartridges back into their storage location without the need for any manual assistance by the operator of the host computer. It would furthermore be advantageous for such an apparatus to have a removable cartridge magazine which will enable the operator to readily interchange optical discs within the apparatus as a group without disassembly or timely individual discs removable from the apparatus. Such an apparatus should be compact and operate in a smooth, accurate and fast manner. It also should have preventive mechanisms which will safeguard the apparatus and its contents from possible mechanical shock or jarring.

SUMMARY OF THE INVENTION

An optical disc cartridge handling apparatus, which has a removable cartridge magazine for loading and unloading of groups of cartridges into the apparatus, for storing, handling, reading and writing of the optical discs stored within the cartridges. A flipper mechanism is provided to receive one of the cartridges from either of the magazine or an optical disc drive within the apparatus. Means are included for rotating the flipper mechanism about a common center line for inverting the cartridge within the flipper mechanism. A picker mechanism is included for moving the cartridge into and out of the flipper mechanism from either the magazine or the optical disc drive. A traverse mechanism is provided for supporting and moving the flipper mechanism along an axis of motion to locate the flipper mechanism adjacent either a particular slot of the magazine or the cartridge slot of the optical disc drive.

A principal object and advantage of the optical disc cartridge handling apparatus of the present invention is that it is compact while yet providing for automated storing, handling, reading and writing of a number of optical discs under the control of a host computer without the need for any manual assistance.

Another advantage and object of the present invention is that it has a removable optical disc cartridge magazine which is readily removable and indexable within the apparatus, when permitted access to the magazine by the apparatus, for the easy and quick manual insertion and/or removal of disc cartridges in the magazine and the apparatus as a whole.

Another advantage and object of the present invention is its unique, smooth, accurate and quick handling in its storage, handling, reading and writing of several optical discs stored within the removable magazine.

Another object and advantage of the present invention is the unique mechanisms which provide for protection of the apparatus and disc cartridges should the apparatus be subject to mechanical shock or jarring.

Another object and advantage of the present invention is that the apparatus provides for vertical storage handling, reading and writing of the cartridges and discs which make the disc less prone to dust and contamination.

BRIEF DESCRIPTION OF THE DRAWINGS

FIG. 3 is a left side elevational view of the apparatus with portions broken away to permit viewing of certain components of the apparatus otherwise not so readily visible;

FIG. 4 is a cross-sectional view of the flipper cartridge retainer mechanism of the apparatus taken along lines 4—4 of FIG. 3;

FIG. 5 is an end elevational view of the flipper bracket and alignment and stopping mechanism of the apparatus as taken along lines 5—5 of FIG. 1;

FIG. 6 is a perspective view of the optical disc cartridge magazine removed from the apparatus;

FIG. 7 is a front elevational view of the magazine taken along lines 7—7 of FIG. 6.

DESCRIPTION OF THE PREFERRED EMBODIMENT

Figure 8:
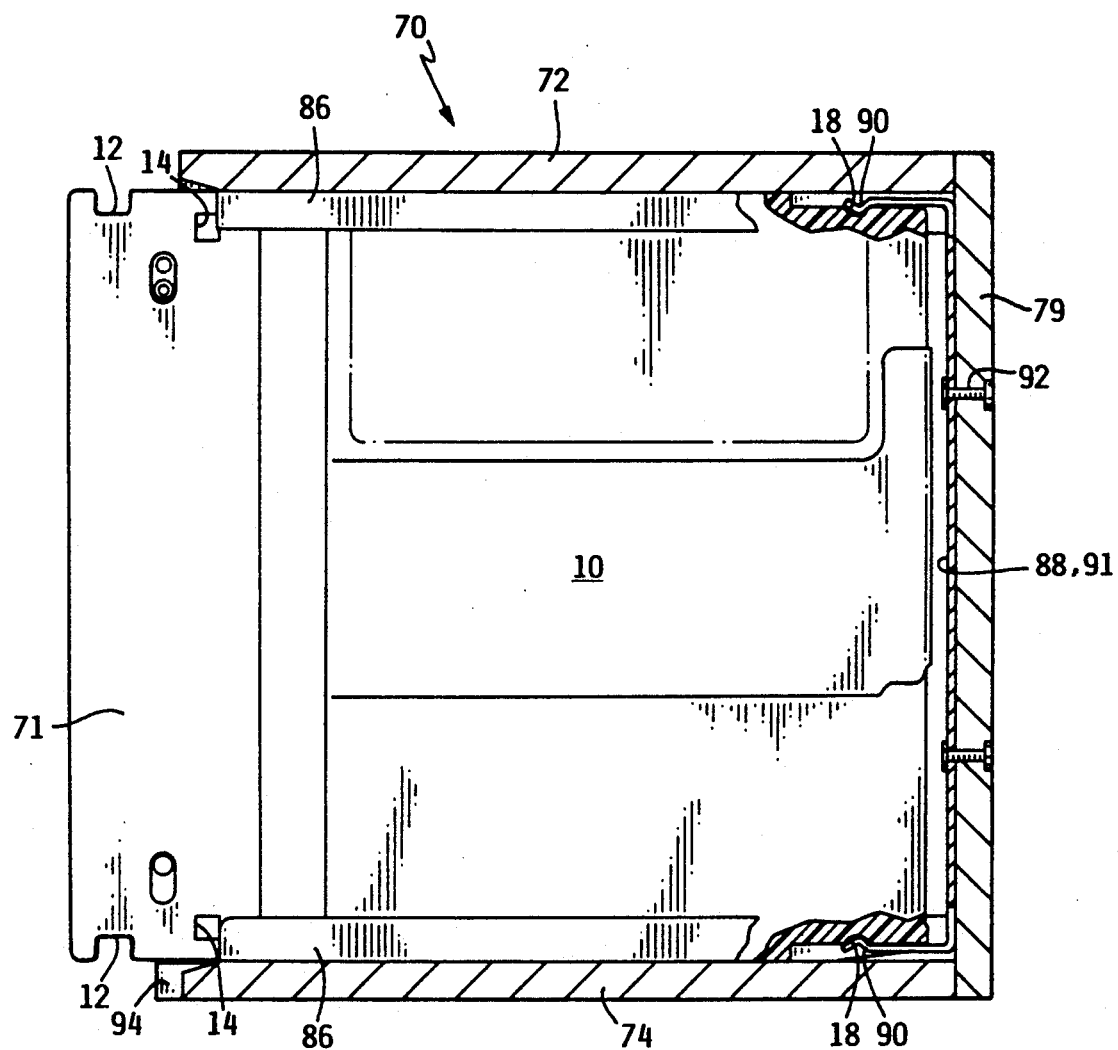
FIG. 8 is a cross-sectional view of the magazine with a cartridge partially broken away therein taken along lines 8—8 of FIG. 7.

Optical disc cartridges 10 are well known and may be seen in the Figures, particularly FIG. 8. Optical disc cartridges 10 each have two opposing pick notches 12 with index or key apertures or holes 14 somewhat adjacent the pick notches 12. Opposite the end of cartridge 10 having pick notches 12 are located two cartridge detents 18 which also permit an indexing function within optical disc drive 20 shown in FIG. 1. Drive 20 typically has its housing 22 with a front panel 24 having an elongate slot 26 within the front panel 24 to permit insertion and removal of an optical disc cartridge 10.

Figure 1:
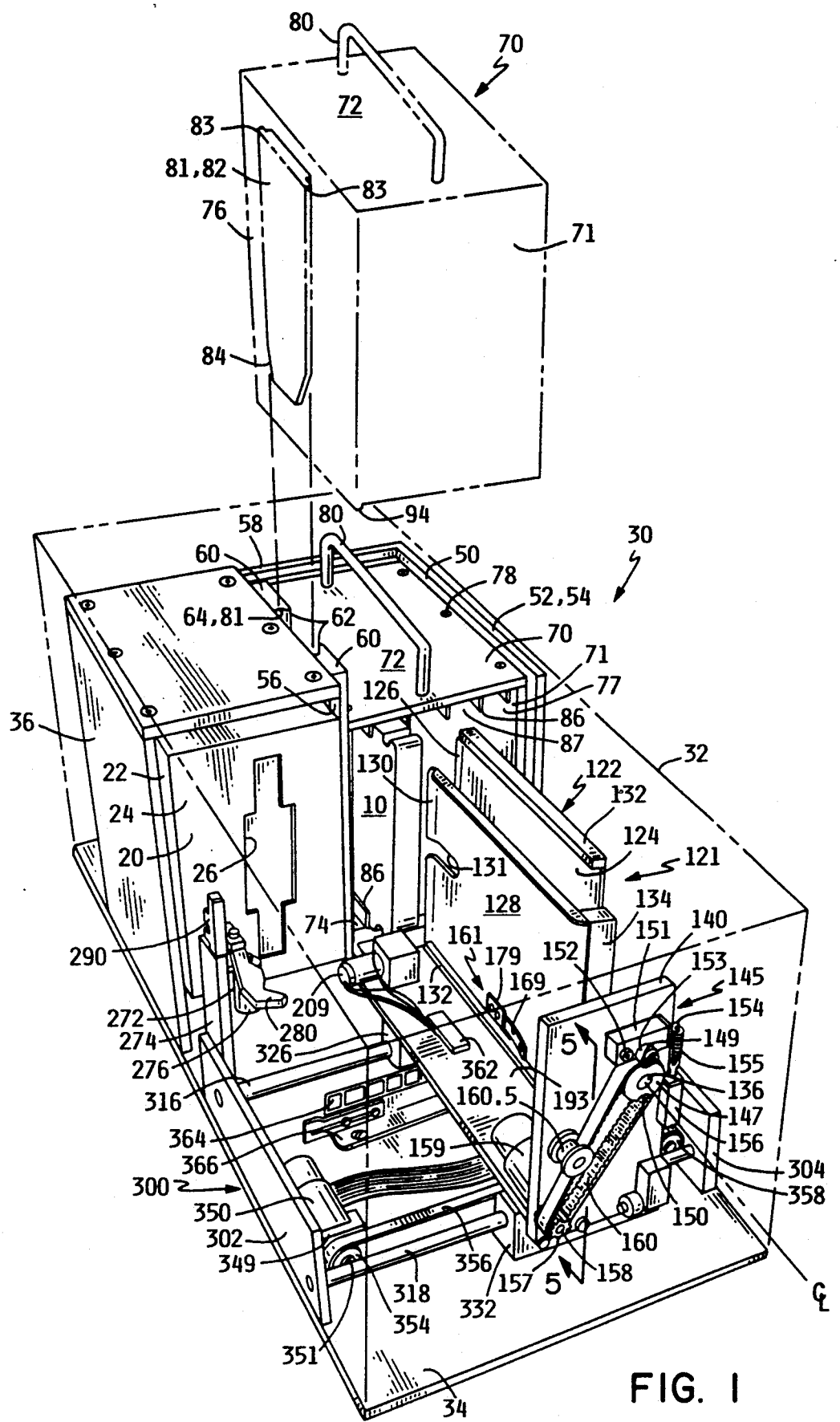
FIG. 1 is a perspective view of the optical disc cartridge handling apparatus with its housing in broken outline and a phantom view of the cartridge magazine elevated up and out of the apparatus.
Figure 2:
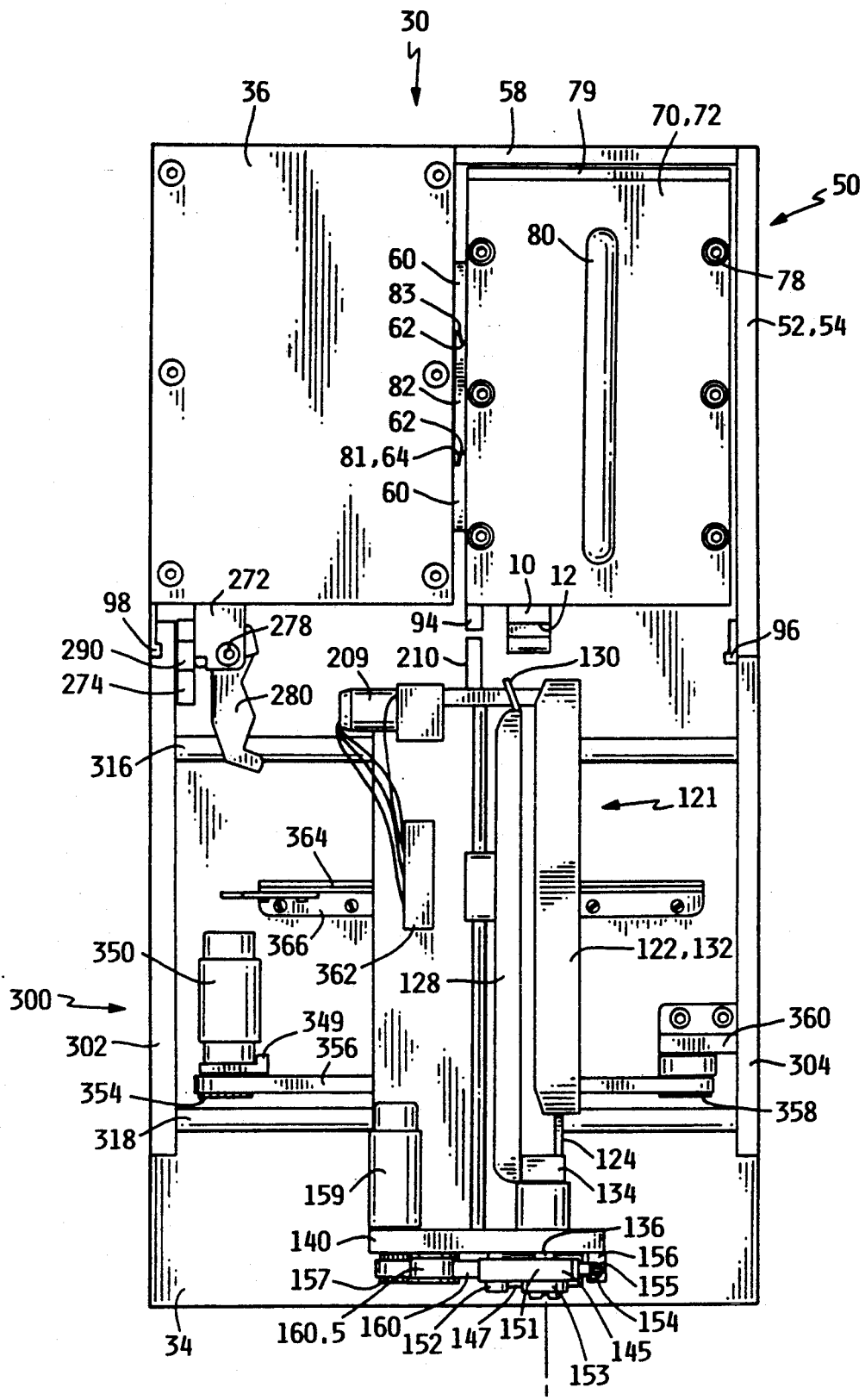
FIG. 2 is a top plan view of the apparatus.

The optical disc cartridge handling apparatus 30 may clearly be seen in FIGS. 1-3. Apparatus 30 has a housing 32 shown in phantom outline and a base plate 34 upon which the apparatus components are mounted. Generally, the apparatus 30 comprises a cartridge or media store 50 with the removable cartridge magazine 70 along with an optical disc drive 20. A media transport element 121 is provided which includes a flipper mechanism 122, flipper alignment and stopping mechanism 145, flipper cartridge retainer mechanism 161, picker mechanism 191, drive loader mechanism 272, and traverse mechanism 300.

More specifically, the optical disc cartridge handling apparatus 30 has a cartridge or media store 50 which includes magazine frame 52. Frame 52 includes an outer vertical side plate 54, an inner vertical side plate 56 and a rear vertical side plate 58. The apparatus 30 and particularly the frame 52 is provided with a cartridge magazine apparatus alignment means 81 discussed further hereafter but which particularly includes magazine guide bars 60 which are vertically oriented. The bars or guides 60 have opposing lips 62 forming magazine guide channel, slot or groove 64 along inner vertical side plate 56.

The cartridge magazine 70 may be clearly seen in FIGS. 1 and 6-8. The magazine 70 includes an open front 71, a top wall 72, a bottom wall 74, inward side wall 76, outward side walls 77 and rear wall 79, all of which are suitably held together such as by mechanical screws 78. Magazine 70 has a handle 80 on its top wall 72 for easy manual grasping and carrying of the magazine 70 as it may be removed from apparatus 30 through an opening (not shown) in housing 32 which appropriately may be under software control.

The cartridge magazine apparatus alignment means 81, as previously discussed with respect to groove 64, further includes index guide, key or tongue 82. Tongue 82 appropriately has protruding lips 83 and a beveled lower end 84 which appropriately permits alignment and indexing of the magazine 70 into its frame 52 as a tongue 82 is guided into groove or slot 64 as may be visualized in FIG. 1.

Within the magazine cartridge 70 and along bottom and top walls 72 and 74 are located ribs 86 which appropriately form slots 87 for the insertion and storage of optical disc cartridges 10. Magazine cartridge retainer means 88 is provided and includes a plate 91 suitably affixed to the inside of rear wall 79 as by machine screws 92. Plate 91 appropriately has opposing pairs of fingers or tabs 90 which are aligned within slots 87. Tabs 90 appropriately have some bias or spring action as to oppose upward movement of the tabs 90. The cartridge magazine 70 also has a sensor flag, knob or tab 94 protruding forwardly from the bottom wall 74 as will be discussed further. Optical sensors 96 and 98 are provided as being mounted along magazine frame walls 52 and disc drive frame 36. One sensor 98 transmits while the other optical sensor 96 receives the photo signal which is interrupted whenever a disc cartridge 10 becomes disjarred from cartridge magazine 70 within the apparatus 30.

By this arrangement, the cartridges 10 are generally retained by retainer means 88 within the magazine 70. Should a cartridge 10 become disjarred from magazine 10, the apparatus 30 is readily so informed that a particular cartridge 10 is partially out of magazine 70 because it breaks the signal between optical sensors 96 and 98.

Media transport element 121 includes a flipper mechanism 122. Flipper mechanism 122 has a side A cartridge holder plate 124 with a cartridge guide lip 126 and a slot 127 (not shown) therethrough. Opposing and parallel side B cartridge holder plate 128 has a cartridge guide lip 130 also with a slot 131 therethrough. Plastic guides 132 are provided along the opposing but remote edges of plates 124 and 128. The plates are held together by a machined bar 134 which is connected to shaft 136 for rotation of the flipper mechanism 122 about center line L. Shaft 136 is then journaled through a flipper mechanism bracket 140.

Flipper mechanism bracket 140 appropriately supports the flipper alignment and stopping mechanism 145 which includes a driven timing pulley 147 connected to shaft 136. Pulley 147 has diametrically opposing detents 149 and 150. Alignment braking bar 151 is biased and pivotally mounted at pivot 152. Bar 151 supports a roller 153 which readily indexes into either detents 149 or 150. The end of bar 151 has an eye or eyelet 154 which suitably supports a spring 155 which is connected to anchor 156.

By this arrangement, the roller 153 may be easily indexed into detents 149 and 150 to assist in stopping the rotation of pulley 147 which is nonrotatably connected to the flipper mechanism 122 and its plates 124 and 128. A timing drive pulley 157 is also mounted in flipper mechanism bracket 140 and suitably has a shaft 158 journaled and passing through bracket 140 connected to flipper motor 159. A timing belt 160 appropriately is wrapped around pulleys 147 and 157 and held at the appropriate tension by idler pulley or keeper 160.5. Flipper motor 159 then provides the rotational force for flipper mechanism 122.

Flipper cartridge retainer mechanisms 161 are provided to align with holes 163 in cartridge holder plates 124 and 128 as clearly shown in FIGS. 3 and 4. Mechanisms 161 each suitably include a hemispherical suitably plastic knob 165. Knob 165 appropriately has a mounting shaft 167 which protrudes through a hole 171 in flat spring bar 169. A retainer ring 173 appropriately locks on mounting shaft 167 to hold knob 165 onto flat spring bar 169. Flat spring 169 then is held onto plates 124 or 128 by screws or bolts 177 passing through retaining plate 179 and held thereat by nuts 181.

Plastic knob 165 by this arrangement is suitably biased and indexable with optical disc cartridge index or key holes 14 to releasably hold disc cartridge 10 within the flipper mechanism 122.

Picker mechanism 191 is suitably disclosed in the co-pending application but is generally described here. Picker mechanism 191 may be seen in FIG. 3 and appropriately includes a picker mechanism bracket 193 which supports a block guide shaft 195. Slidably mounted on shaft 195 are pusher block 197 and picker block 199. Picker block 199 supports a rotatable picker 201 which is indexable with pick notches 12 of cartridge 10. A timing belt 203 is suitably wrapped around bracket pulley 205 and a drive pulley suitably connected to the rotating shaft of picker motor 209. Retro-reflective optical sensor 210 is also mounted on picker mechanism bracket 193 and appropriately signals the apparatus of the presence of the cartridge magazine 70 within the apparatus by way of sensing the presence of sensor knob or tab 94.

Drive loader mechanism 272 is also disclosed in the co-pending application but is generally described here and is supported by bracket 274. Drive loader motor 276 is mounted on bracket 274 and appropriately has a rotating shaft 278 connected to a load arm 280 and a load arm plate or flag 284 which passes through load arm photo optical sensor 290.

Traverse mechanism 300 appropriately has side support plates 302 and 304 which support therebetween a forward traverse guide shaft 318 and a rear traverse guide shaft 316. On the bottom side of picker mechanism bracket 193 are located forward and rearward traverse guide blocks 332 and 326 which appropriately have apertures and bushings passing therethrough for mounting the flipper and picker mechanisms 122 and 191 for movement along an axis of motion to locate the mechanisms in front of either the magazine 70 or the optical disc drive 20. Bracket 349 is suitably mounted on base plate 34 and supports traverse motor 350 which has a drive pulley 354 mounted on the rotating shaft 351 of motor 350. Pulley 354 has a timing belt 356 therearound and also around driven or idler pulley 358 located on mounting bracket 360 suitably mounted on base plate 34. The underside of picker mechanism bracket 193 also suitably supports a photo-interrupter sensor 362 through which passes traverse position photographic process code strip 364 adjustably mounted on bracket 366 supported by base plate 34. By this arrangement, the apparatus 30 knows where the traverse mechanism 300 has positioned the flipper and picker mechanism 122 and 191 with respect to magazine 70 or drive 20.

In operation, the apparatus 30 is initially hooked up to a host computer by SCSI connectors. However, several of the apparati may be daisy-chained together. After the power has been fed to the apparatus 30 through a suitably power plug and switch, the apparatus 30 is controlled by a host computer by way of common command set commands. The apparatus 30 includes control electronics (not shown) such as printed wire assemblies, firmware and switch panels. A microprocessor or micro-controller may be operatively used by way of a microcode routine which receives sensor inputs and RAM and EPROM memory data to control the DC motors and their motor driver circuits.

The cartridge magazine 70 is accessed by way of a software controlled door (not shown) in apparatus housing 32. Upon the opening of the door, the handle 80 of cartridge magazine 70 is readily accessible by the human hand. The operator may then lift the magazine 70 upwardly and outwardly of the apparatus as shown in FIG. 1. Because of the magazine cartridge retainer means 88, the cartridge magazine 70 may be transported about without a fear of the cartridges 10 falling out of the magazine 70 and perhaps being damaged.

After the user has loaded the magazine 70 with the appropriate cartridges 10, the magazine 70 is appropriately lowered into the magazine frame with the assistance of the cartridge magazine apparatus alignment means 81, which is appropriately the tongue 82 and groove 64 arrangement. Thereafter, the door will be closed and the apparatus 30 begins to initialize. Retro-reflective optical sensor 210 recognizes that the cartridge magazine 70 is in the apparatus 30 by way of the reflection off of tab or flag 94. Thereafter, a cartridge 10 may be picked from any slot 87 of the magazine 10 and pushed into another slot 87 of magazine 70 or located in front of the slot 26 of optical disc drive 20. If the flipper mechanism 122 is located or moved in front of the optical disc drive 20, the flipper mechanism may have or may not have gone through inversion by way of the flipper alignment and stopping mechanism 145. Thereafter, the picker mechanism 191 pushes the cartridge 10 out of the flipper mechanism 122 after which the optional drive loader mechanism 272 moves load arm 280 through slots 127 and 131 to load the cartridge 10 into the disc drive 20. When the drive 20 has finished with optical disc cartridge 10, the cartridge 10 is ejected from drive 20 after which it may be picked by the picker mechanism 191 and loaded into the flipper mechanism 122. The flipper cartridge retainer mechanism 161 assures that the cartridge remains in the flipper mechanism 122 until it is pushed outwardly by the picker mechanism 191. The flipper alignment and stopping mechanism 145, particularly the timing pulley 147 with detents 149 and 150 along with the alignment breaking bar 151 and roller 153, suitably assure proper vertical alignment and stopping of the flipper mechanism 122 in an expeditious manner to assure smooth, fast and accurate operation of the apparatus 30.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. An optical disc cartridge handling apparatus for storing, handling, reading and writing of optical discs stored in cartridges which store data, comprising:
   (a) a cartridge magazine removable from the apparatus for loading and unloading the cartridges in the apparatus, the magazine having slots therein for storing the cartridges;
   (b) a flipper mechanism adapted to receive one of the cartridges from both the magazine and an optical disc drive with a cartridge slot, the flipper mechanism comprises:
      (i) a pair of opposing plates for receiving and holding one of the cartridges in a sandwich-like manner to permit inversion and location of the cartridge;
      (ii) a driven pulley connected to the plates for rotating the plates about a common center line for inverting the cartridge; and
      (iii) a flipper alignment and stopping mechanism for stopping and aligning the flipper in front of the appropriate slot of the magazine or the optical disc drive slot comprising diametrically opposed detents on the pulley and a pivotally mounted and biased alignment breaking bar with a roller indexable within the detents;

(c) a picker mechanism comprised of a cartridge pusher and picker mounted along and adjacent the flipper mechanism for moving the cartridge into and out of the flipper mechanism from both the magazine and the optical disc drive cartridge slot; and (d) a traverse mechanism for supporting and moving the flipper mechanism along an axis of motion to locate the flipper mechanism adjacent from both the magazine and the optical disc drive.

2. The optical disc cartridge handling apparatus of claim 1, further comprising a flipper cartridge retainer mechanism to releasably hold the cartridge within the flipper, comprising a biased knob supportably mounted on one of the plates adapted to be releasably indexable within an index hole in the cartridge to hold the cartridge in the flipper mechanism.

3. The optical disc cartridge handling apparatus of claim 2, wherein the flipper cartridge retainer mechanism further comprises a flat spring bar mounted on one of the plates having the knob affixed thereto.

4. The optical disc cartridge handling apparatus of claim 1, further comprising a cartridge magazine alignment means to index and guide the magazine into and out of the apparatus.

5. The optical disc cartridge handling apparatus of claim 4, wherein the cartridge magazine alignment means comprises a tongue slidably indexable and interlockable in a groove between the magazine and the apparatus.

6. The optical disc cartridge handling apparatus of claim 1, further comprising a magazine cartridge retainer means to releasably hold the cartridges in the magazine.

7. The optical disc cartridge handling apparatus of claim 6, wherein the magazine cartridge retainer means comprises biased fingers within the magazine which are indexable in detents on the cartridges.

8. An optical disc cartridge handling apparatus for storing, handling, reading and writing of optical discs stored in cartridges which store data, comprising:

(a) a cartridge magazine removable from the apparatus for loading and unloading the cartridges in the apparatus, the magazine having slots therein for storing the cartridges, cartridge magazine alignment means to index and guide the magazine into and out of the apparatus and magazine cartridge retainer means to releasably hold the cartridges in the magazine;

(b) a flipper mechanism adapted to receive one of the cartridges from both the magazine and an optical disc drive with a cartridge slot, wherein the flipper mechanism comprises:

(i) a pair of opposing plates for receiving and holding one of the cartridges in a sandwich-like manner to permit inversion and location of the cartridge;

(ii) a driven pulley connected to the plates for rotating the plates about a common center line for inverting the cartridge; and (iii) a flipper alignment and sopping mechanism for stopping and aligning the flipper in front of the appropriate slot of the magazine or the optical disc drive slot, comprising diametrically opposed detents on the pulley and a pivotally mounted and biased alignment breaking bar with a roller indexable within the detents;

(c) a picker mechanism comprised of a cartridge pusher and picker mounted along and adjacent the flipper mechanism for moving the cartridge into and out of the flipper mechanism from both the magazine and the optical disc drive cartridge slot; and (d) a traverse mechanism for supporting and moving the flipper mechanism along an axis of motion to locate the flipper mechanism adjacent both the magazine and the optical disc drive.

9. The optical disc cartridge handling apparatus of claim 2, further comprising a flipper cartridge retainer mechanism to releasably hold the cartridge within the flipper, comprising a biased knob supportably mounted on one of the plates adapted to be releasably indexable within an index hole in the cartridge to hold the cartridge in the flipper mechanism.

10. The optical disc cartridge handling apparatus of claim 9, wherein the flipper cartridge retainer mechanism further comprises a flat spring bar mounted on one of the plates having the knob affixed thereto.

11. The optical disc cartridge handling apparatus of claim 8, wherein the cartridge magazine alignment means comprises a tongue slidably indexable and interlockable in a groove between the magazine and the apparatus.

12. The optical disc cartridge handling apparatus of claim 8, further comprising magazine cartridge retainer means comprised of biased fingers within the magazine which are indexable in detents on the cartridges.

* * * * *